US007242307B1

(12) United States Patent
LeBlond et al.

(10) Patent No.: US 7,242,307 B1
(45) Date of Patent: Jul. 10, 2007

(54) SYSTEM FOR MONITORING HYGIENE APPLIANCES

(75) Inventors: Claude W. LeBlond, Irvine, CA (US); Henry M. Ortiz, Aliso Viejo, CA (US)

(73) Assignee: Cognetive Systems Incorporated, Irvine, CA (US)

( * ) Notice: Subject to any disclaimer, the term of this patent is extended or adjusted under 35 U.S.C. 154(b) by 56 days.

(21) Appl. No.: 10/967,994

(22) Filed: Oct. 19, 2004

Related U.S. Application Data (60) Provisional application No. 60/512,962, filed on Oct. 20, 2003.

(51) Int. Cl.
*G08B 23/00* (2006.01)

(52) U.S. Cl. .............................. 340/573.1; 340/572.1; 340/3.1; 4/623

(58) Field of Classification Search ............. 340/573.1, 340/573.4, 572.1, 541, 539.1, 539.11, 539.13, 340/3.1; 4/623, 661
See application file for complete search history.

(56) References Cited

U.S. PATENT DOCUMENTS

| | | | |
|---|---|---|---|
| 3,478,344 A | 11/1969 | Schwitzgebel et al. | |
| 3,764,984 A | 10/1973 | McCartney | |
| 3,805,265 A | 4/1974 | Lester | |
| 4,254,472 A | 3/1981 | Juengel et al. | |
| 4,375,637 A | 3/1983 | Desjardins | |
| 4,538,138 A | 8/1985 | Harvey et al. | |
| 4,567,557 A | 1/1986 | Burns | |
| 4,743,892 A | 5/1988 | Zayle | |
| 4,746,907 A | 5/1988 | Zehnder, Jr. | |
| 4,896,144 A | 1/1990 | Bogstad | |
| 5,202,666 A | 4/1993 | Knippscheer | |
| 5,610,589 A | 3/1997 | Evans et al. | |
| 5,611,465 A | 3/1997 | Lee et al. | |
| 5,691,919 A | 11/1997 | Gemmell et al. | ........... 702/163 |
| 5,745,049 A | 4/1998 | Akiyama et al. | |
| 5,878,381 A | 3/1999 | Gemmell et al. | ........... 702/163 |

(Continued)

*Primary Examiner*—Toan N. Pham
(74) *Attorney, Agent, or Firm*—Blakely Sokoloff Taylor & Zafman LLP (57) ABSTRACT

A hygiene appliance monitoring system for determining washroom element functional status and sequence of operation generally includes a plurality of wireless communication devices with a first number of the wireless communication devices being disposed within or adjacent washroom elements and operative for monitoring and reporting functional status and operation thereof. A second number of the wireless communication devices disposed in tags suitable for carrying by individuals. A third number of wireless communication devices being configured for recognizing a presence of the second number of wireless communication devices and differentiating distances between the third number of the wireless communication devices and the second number of wireless communication devices in order to determine if a washroom element associated with the one of the first number of wireless communication devices is to be ascribed to one of the tags and reporting thereon by an output signal. The wireless communication devices communicate the output signal to a receiving device provided for transmitting to a data server for analysis.

Functional status, operational sequence, consumable content of the washroom elements, identification of the individual tag wearer with respect to the proximity of washroom elements and the state or relationship between the plurality of elements and tags and therefore adherence with cleansing policy as a managed process with personal and hygiene facilities cleansing and sanitizing requirements can be determined.

32 Claims, 3 Drawing Sheets

U.S. PATENT DOCUMENTS

| | | |
|---|---|---|
| 5,900,801 A | 5/1999 | Heagle et al. |
| 5,905,436 A | 5/1999 | Dwight et al. |
| 5,910,776 A | 6/1999 | Black |
| 5,917,425 A | 6/1999 | Crimmins et al. |
| 5,939,974 A | 8/1999 | Heagle et al. |
| 5,945,910 A | 8/1999 | Gorra |
| 5,952,924 A | 9/1999 | Evans et al. |
| 5,959,533 A | 9/1999 | Layson, Jr. et al. |
| 5,973,601 A | 10/1999 | Campana, Jr. |
| 6,000,429 A | 12/1999 | Van Marcke |
| 6,002,334 A | 12/1999 | Dvorak |
| 6,037,871 A | 3/2000 | Babylon |
| 6,038,331 A | 3/2000 | Johnson |
| 6,072,396 A | 6/2000 | Gaukel |
| 6,100,806 A | 8/2000 | Gaukel |
| 6,124,806 A | 9/2000 | Cunningham et al. |
| 6,195,006 B1 | 2/2001 | Bowers et al. |
| 6,195,588 B1 | 2/2001 | Gauthier et al. |
| 6,211,788 B1 | 4/2001 | Lynn et al. |
| 6,225,906 B1 | 5/2001 | Shore |
| 6,236,317 B1 | 5/2001 | Cohen et al. |
| 6,236,953 B1 | 5/2001 | Segal |
| 6,353,764 B1 | 3/2002 | Imagawa et al. |
| 6,360,181 B1 | 3/2002 | Gemmell et al. ........... 702/128 |
| 6,375,038 B1 | 4/2002 | Daansen et al. |
| 6,392,546 B1 | 5/2002 | Smith |
| 6,396,413 B2 | 5/2002 | Hines et al. |
| 6,411,920 B1 | 6/2002 | McConnell et al. ........ 702/177 |
| 6,426,701 B1 | 7/2002 | Levy et al. |
| 6,532,416 B1 | 3/2003 | Mueller |
| 6,549,816 B2 | 4/2003 | Gauthier et al. |
| 6,701,194 B2 | 3/2004 | Gauthier et al. |
| 6,727,818 B1 | 4/2004 | Wildman et al. |
| 6,882,278 B2 | 4/2005 | Winings et al. |
| 6,895,296 B2 | 5/2005 | Holt et al. ................. 700/139 |
| 6,898,552 B2 | 5/2005 | Marcichow |
| 6,956,498 B1 * | 10/2005 | Gauthier et al. ....... 340/825.69 |
| 6,975,231 B2 * | 12/2005 | Lane et al. .............. 340/573.1 |
| 7,099,649 B2 | 8/2006 | Patterson et al. |
| 2001/0025349 A1 | 9/2001 | Sharood et al. |
| 2003/0030562 A1 | 2/2003 | Lane et al. |
| 2003/0210140 A1 | 11/2003 | Menard et al. |
| 2004/0012524 A1 | 1/2004 | Couronne et al. |
| 2005/0035862 A1 | 2/2005 | Wildman et al. |
| 2005/0134465 A1 | 6/2005 | Rice et al. |
| 2005/0145745 A1 | 7/2005 | Lewis et al. ................ 424/563 |
| 2005/0149414 A1 | 7/2005 | Schrodt et al. ............... 705/29 |
| 2005/0197732 A1 | 9/2005 | Holt et al. .................. 700/139 |

* cited by examiner

SYSTEM FOR MONITORING HYGIENE APPLIANCES

The present application claims priority from provisional patent application Ser. No. 60/512,962 filed Oct. 20, 2003 and by this specific reference thereto incorporates the provisional application in total into present application.

The present invention relates to personal hygiene and the use of hygiene facilities as a process or service. More particularly, the present invention relates to a management system for remotely monitoring the status, proper functioning and timely maintenance of hygiene facilities as integral elements of hygiene processes or services, and in specific cases, the remote monitoring of personnel and their use of hygiene facilities in adherence to a hygiene process with personal cleansing and sanitizing requirements.

In recent years, the public's growing concern with disease and its transmission has generated increased public awareness of the topic of cleansing, and hygiene in general. Most major marketers in the cleansing and hygiene industry now believe that with increased public awareness and education, cleansing, and especially hand cleansing, will continue to be a subject of increasing scrutiny. As a result, industries such as the health care, food preparation, food services, and the hotel and travel industries have been forced to examine cleansing processes, procedures, and their efficacy.

Whether it is the possible transmission of *E. coli* in the food services industry, the rhinovirus in elementary schools, nosocomial diseases within healthcare facilities, or even the ordinary contact made during a simple handshake, there are numerous studies citing effective hand hygiene as the best way to guard against disease transmission. The CDC has concluded that hand washing is the single most important factor in the prevention of disease and the spread of infection. The need for, and effectiveness of proper hand hygiene is therefore well understood.

Whether part of a personal hygiene process common in many industries; or part of public restrooms present as a patron service in a restaurants, airports, or any building or establishment frequented by the general public, properly functioning hygiene facilities are integral elements of any hygiene process or service. The janitorial and sanitation industry cite that at any given moment 40% of soap dispensers are empty, 70% of all air sanitizers are not functioning, and with regard to businesses, 2 out of the top 3 customer complaints are related to restroom facilities. These statistics suggest that improperly maintained hygiene facilities not only hinder personnel adherence to cleansing and sanitizing processes, but also harm businesses by providing hygiene facility services that are unacceptable to customers.

Non-compliance with established hand washing protocol is a serious problem with expensive and sometimes fatal consequences. Each year, food borne illness strikes 76 million people, causes 325,000 hospitalizations, and kills over 5,000. 70% of the outbreaks originate in the food service sector. 40% of these are the result of poor hand washing and cross contamination (oral/fecal).

The annual cost of food borne illness in terms of pain and suffering, reduced productivity, and medical costs are estimated to be as high as $83 billion. Approximately 2 million hospital patients annually become infected while being treated for another illness or injury. Of these 2 million infected patients, approximately 88,000 will die. The CDC estimates that these infections or illnesses, called nosocomial infections, add nearly $4.5 billion to U.S. healthcare costs annually. The CDC also estimates that one third of all nosocomial infections are caused by poor adherence to infection control practices, such as hand washing.

The CDC estimates that nosocomial infections cost on average $35,000 per incidence in extended medical costs. With respect to hospitals and hospital staff, it is estimated that the rate of hand washing non-compliance among healthcare workers is an astonishing 70-80%.

In a study reported in the Journal of Infectious Diseases in Children, fecal coliforms were detected on the hands of some 20 percent of the daycare staff evaluated. Further, a third of the facilities studied had poor hand washing systems and no policy for hand washing before eating or after playing outside.

The Food and Drug Administration (FDA) assists the approximately 75 state and territorial agencies and more than 3,000 local departments that assume primary responsibility for preventing food borne illness, and for licensing and inspecting establishments within the retail segment of the food industry. This consists of more than one million establishments, and employs a work force of over 12 million. The FDA maintains a model Food Code to assist food control jurisdictions at all levels of government by providing them with a scientifically sound technical and legal basis for regulating the retail segment of the food industry. According to the model Food Code, a person must wash after using the bathroom, and defines a hand washing process with a duration of a minimum 20 seconds with concentration on the fingers and fingernails. In addition to timing the process protocol of washing including the use of soap water is defined. Many operators in commercial food service have expanded on the FDA model with more rigorous protocols.

Within the janitorial and sanitation industry, and more specifically within the building services contracting sector, it is estimated that labor necessary for performing janitorial services accounts for 80% to 90% of costs. The management system described herein aims to aid in reducing the costs of routine maintenance of hygiene facilities by remotely monitoring the status, proper functioning, and timely maintenance of hygiene facilities, and providing an efficient schedule and protocol for ensuring that hygiene facilities are properly serviced, maintained, and operating properly.

One approach to aid in cleansing procedure compliance is shown in U.S. Pat. No. 6,375,038B1. This simple system embodies audio and visual prompts to promote adherence with proper cleansing techniques.

Another procedure oriented invention is described in U.S. Pat. No. 5,945,910 that embodies a monitoring module that operates in conjunction with an existing soap dispenser to track usage by individuals and provides a means of administrator review of the data.

A system activated by the flushing of a toilet is described in U.S. Pat. No. 4,896,144. This warning system monitors the use of cleansing facilities with a remote signaling system. In one embodiment a door locking element prevents exit from the area in the event of incomplete cleansing protocol.

A time activated cleaning embodiment is disclosed in U.S. Pat. No. 5,611,465 that uses an automated timing device to introduce cleaner into the toilet bowl.

A complex system for monitoring and controlling a series of washroom appliances is demonstrated by U.S. Pat. No. 6,000,429 wherein internal sensors communicating with a remote controller to facilitate a maintenance routine.

A system to identify a towel dispensing cabinet in need of routine maintenance when the inventory of towels contained therein becomes soiled is shown in U.S. Pat. No. 4,746,907.

SUMMARY OF THE INVENTION

A hygiene appliance monitoring system in accordance with the present invention generally includes a plurality of wireless communication devices with the first number of the wireless communication devices being disposed within or adjacent washroom elements and operative for monitoring and reporting the status and operation thereof.

A second number of wireless communication devices disposed in tags suitable for carrying by individuals which uniquely identify the individuals.

A third number of wireless communication devices being disposed within or adjacent washroom elements and operative for recognizing the presence and uniqueness of the second number of wireless communication devices and differentiating distances between the third number of wireless communication devices and the second number of wireless communication devices in order to determine if use of a washroom element associated with one of the third number of wireless communication devices is to be ascribed to one of the tags and reporting therein by an output signal. The third wireless communication device is in communication with the first and second communication devices for recording and transmitting the monitoring data generated to a data server for processing.

The invention includes one or many of a plurality of washroom elements. Such washroom elements may include paper dispensers, water closets, sinks, faucets, towel dispensers, drains, doors, air fresheners and soap dispensers.

In order to manage the hygiene process and therefore monitor operation of washroom elements, a hygiene appliance monitoring system in accordance with the present invention may include a plurality of wireless communication devices with a first number of the wireless communication devices being disposed within or adjacent washroom elements and operative monitoring and reporting the functional status, operational sequence, and consumable content of each washroom element. A second number of wireless communication devices disposed in tags suitable for carrying by individuals which uniquely identify the individuals. A third number of wireless communication devices being disposed within or adjacent washroom elements and operative for recognizing the presence and uniqueness of the second number of wireless communication tags and differentiating distances between the third number of wireless communication devices and the tags. The third wireless communication device in communication with a fourth wireless communication device provided for transmitting to a data server a functional status, operational sequence, and consumable content of the washroom elements, identification of the tag with respect to the proximity of washroom element, the state or relationship between the plurality of elements and tags and therefore adherence with hygiene policy as a managed process.

BRIEF DESCRIPTION OF THE DRAWINGS

The features and advantages of the present invention are apparent from the following detailed description in conjunction with the accompanying drawings.

DETAILED DESCRIPTION

Figure 1:
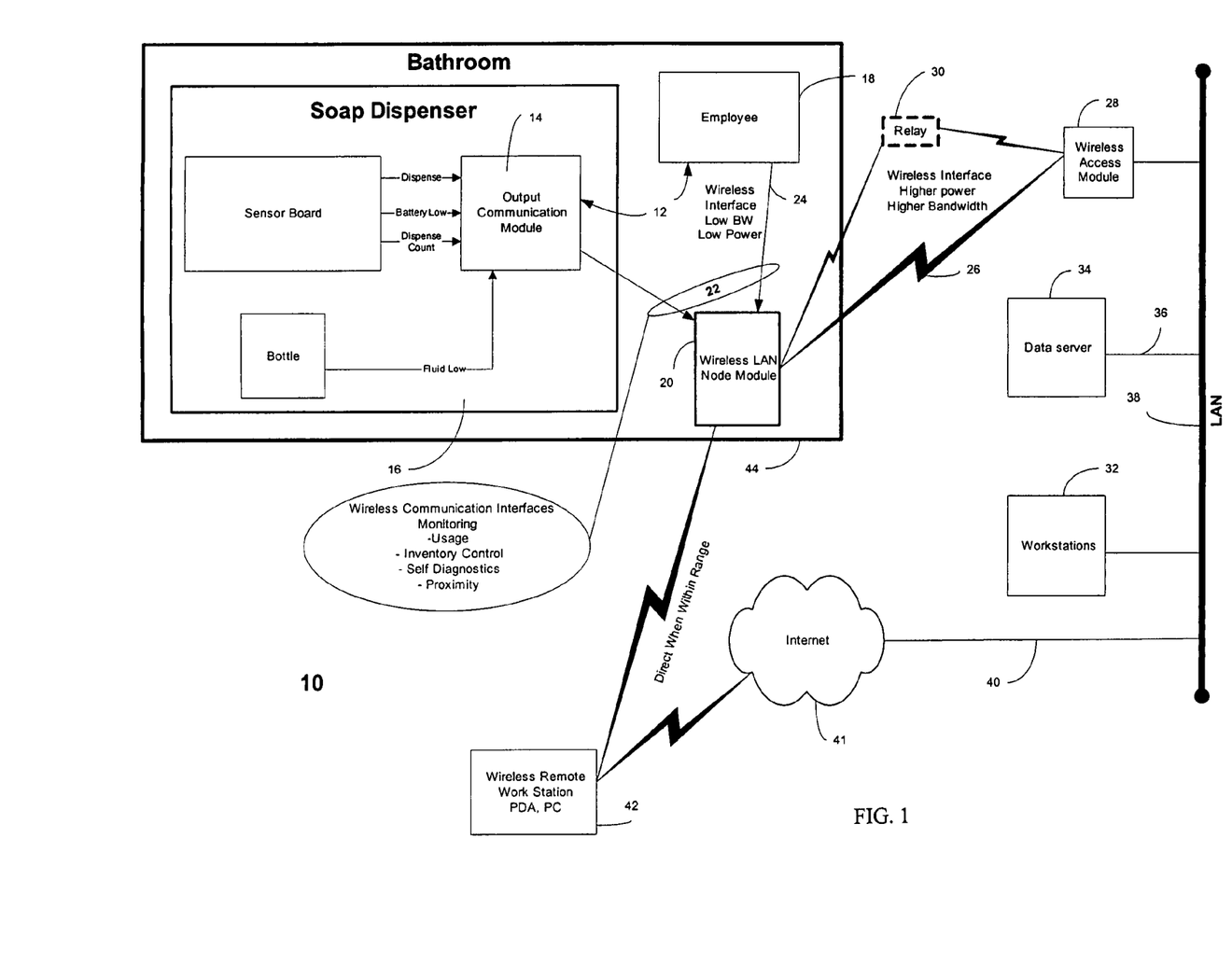
FIG. 1. is a block diagram of a basic hygiene appliance monitoring system in accordance with the present invention showing one washroom element.

With reference to FIG. 1, there is shown a hygiene appliance monitoring system 10 in accordance with the present invention. The system 10 includes a plurality of wireless communication devices 12 which includes a first wireless communication device 14, adjacent or within a soap dispenser washroom element 16.

In addition, a second number of wireless communication devices 18 may be provided and disposed in tags suitable for carrying by individuals (not shown), for clarity only one of the second number of wireless communication devices 18 is shown in FIG. 1.

The wireless communication devices 14 and 18, communicate directly with the third wireless communication device 20, as indicated by the lines 22. The third wireless communication device 20 is configured to recognize a presence of the second wireless communication device 18 shown by line 24 and differentiates distances between the third wireless communication device and the second wireless communication device 18 in order to determine if the use of the washroom element 16 is to be ascribed to one of the wireless communication device tags 18.

It should be appreciated that the wireless communication devices utilized in accordance with the present invention includes software and electronic circuitry enabling differentiation of distances based on conventional radio frequency electromagnetic wave propagation strength measured between the second wireless communication devices 18 and the third wireless communication devices 20.

The wireless communication device 20 is in communication with the wireless communication devices 14 and 18 for recording an input signal. The output signal is consolidated and transmitted to a receiver 28 as shown by line 26.

If the receiver 28, is outside the range of the wireless communication device 20, a further wireless communication device or relay, 30 may be utilized to relay the signal.

A management workstation 32 with a data processor/server 34 which functions for analyzing a sequence of operations or operational status of the washroom element 16.

Remote monitoring of the status and use of the washroom elements 16 may be accomplished through a connection 36 to a local area network 38 which in turn may be connected through a wide area network 40 to the internet 41, which in turn is accessible through a remote management work device 42.

A user of the washroom 44 wearing the tag 18 can be monitored in relationship with the soap dispenser washroom element 16. Monitoring of the soap dispenser 16 evaluates the status of the washroom element for the purpose of determining sequence of operation, operational status, diagnostic analysis, consumable content level. Identification of the tag 18 with respect to the proximity of the washroom element and recording the state or relationship between the element operation and tag resolves adherence with hygiene policy as a managed process and can be determined by state relationship software in the workstation 32.

Figure 2:
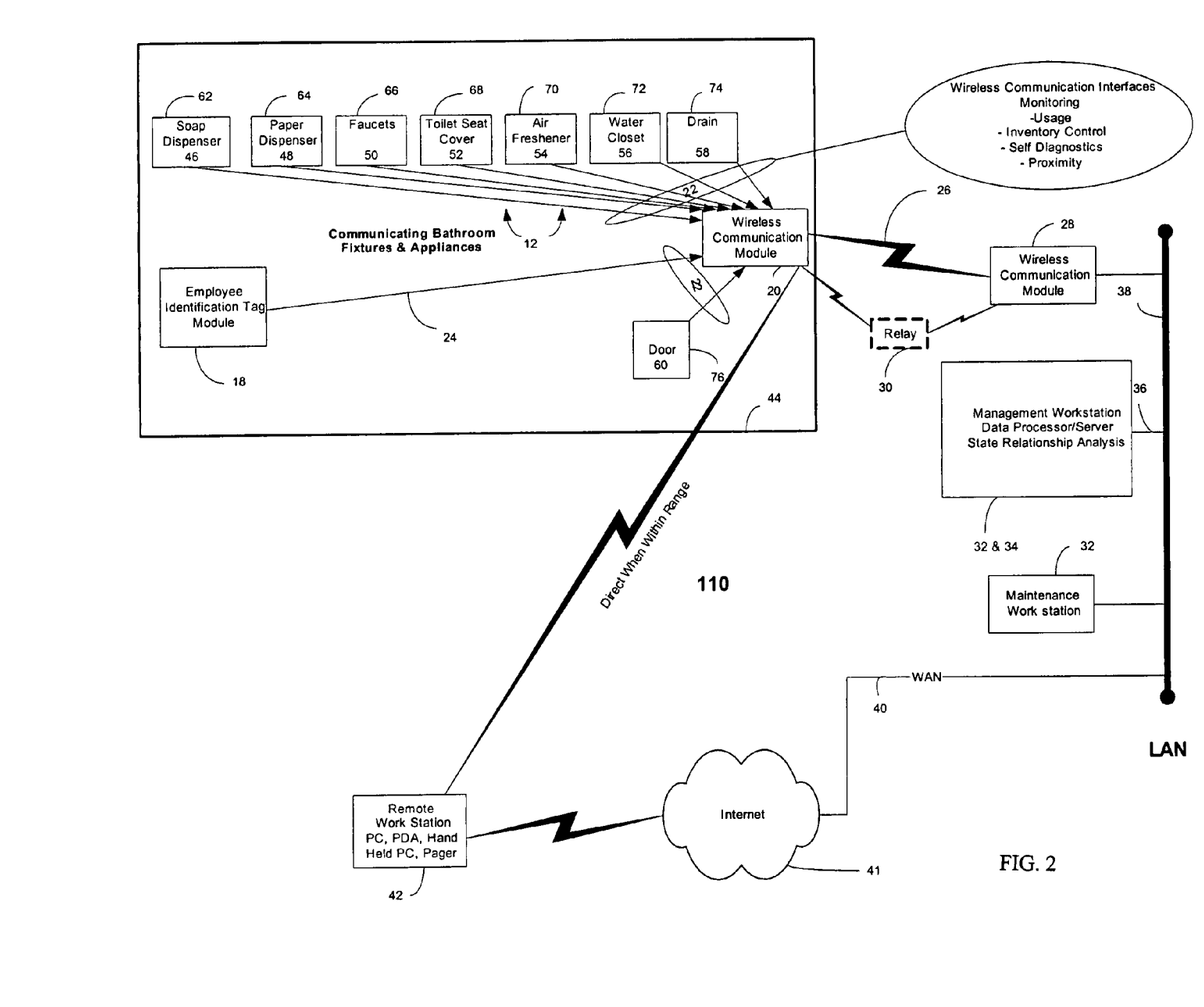
FIG. 2. is a block diagram of a hygiene appliance monitoring system in accordance with the present invention showing multiple washroom elements.

With reference to FIG. 2, there is shown a hygiene appliance monitoring system 110 in accordance with the present invention in which common elements of FIG. 1 are represented by common reference characters.

The system generally includes a plurality of wireless communication devices 12 which include a first number of wireless communication devices 46, 48, 50, 52, 54, 56, 58, and 60 adjacent washroom elements such as, a soap dispenser 62, a paper dispenser 64, faucets 66, a toilet seat cover 68, an air freshener 70, a water closet 72, a drain 74 and a door 76 respectively.

In addition, a second number of wireless communication devices 18 may be provided and disposed in tags suitable for carrying by individuals (not shown), only one of the second number of wireless communication devices 18 is shown in FIG. 2 for clarity.

The first number of wireless communication devices 46, 48, 50, 52, 54, 56, 58, 60 and the second number of wireless devices represented by 18 communicate directly with the third wireless communication device 20, as indicated by the bundle of lines 22. The third wireless communication device 20 is configured to recognize a presence of the second wireless communication device 18 shown by line 24 and differentiates distances between the third wireless communication device and the second wireless communication device 18 in order to determine if the use of washroom elements 62, 64,66,68,70,72,74 and 76 is to be ascribed to one of the wireless communication device tags 18

It should be appreciated that the wireless communication devices utilized in accordance with the present invention includes software and electronic circuitry enabling differentiation of distances based on conventional radio frequency electromagnetic wave propagation strength measured between the second wireless communication devices 18 and the third wireless communication devices 20.

The wireless communication device 20 is in communication with the wireless communication devices 46-60 and tags 18 for recording an input signal. The output signal is consolidated and transmitted to a receiver 28 as shown by line 26.

If the receiver 28, is outside the range of the wireless communication device 20, a further wireless communication device or relay, 30 may be utilized to relay the signal.

A management workstation 32 with a data processor/ server 34 which functions for analyzing a sequence of operations or operational status of the washroom elements 62-76.

Remote monitoring of the status and use of all the washroom elements 62-76 may be accomplished through a connection 36 to a local area network 38 which in turn may be connected through a wide area network 40 to the internet 41, which in turn is accessible through a remote work device 42.

A user of the washroom 44 wearing the tag 18 can be monitored in relationship with the washroom elements 62-76. Monitoring of the washroom elements evaluates the status of the washroom element for the purpose of determining sequence of operation, operational status, diagnostic analysis, and consumable content level. Identification of the tags 18 with respect to the proximity of the washroom element and recording the state or relationship between the element operation and tag resolves adherence with hygiene policy as a managed process and can be determined by state relationship software in the workstation 32.

Figure 3:
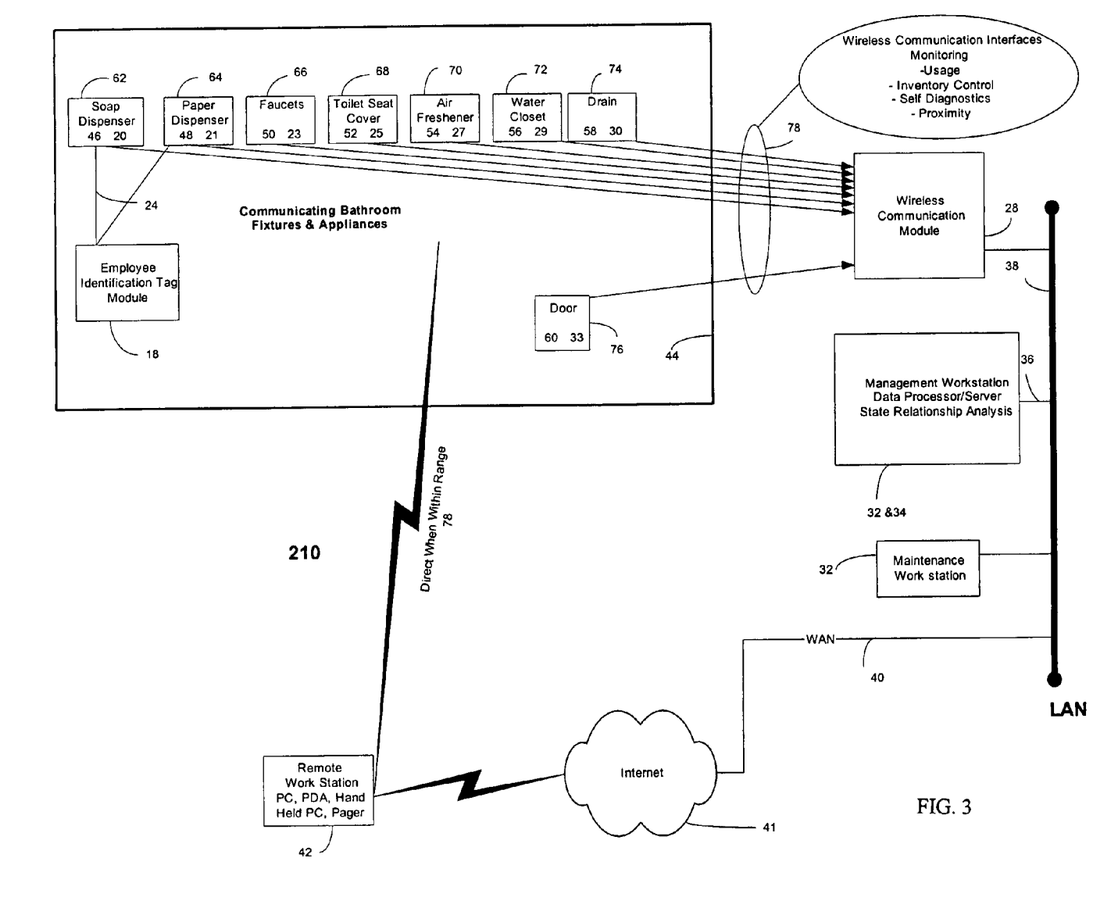
FIG. 3. is a block diagram of an alternative hygiene appliance monitoring system in accordance with the present invention showing multiple washroom elements.

With reference to FIG. 3, there is shown an alternative embodiment 210 of a system in accordance with the present invention in which common elements in FIGS. 1 & 2 are represented by common reference characters.

In this system 210, the first number of wireless communication devices 46, 48, 50, 52, 54, 56, 58, 60 and the third wireless communication devices 20, 21, 23, 25, 25, 27, 29, 31, and 33 communicate the output signal directly with the receiver 28, as indicated by the bundle of lines 78. The third wireless communication devices are configured to recognize a presence of the second wireless communication device 18 shown by line 24 and differentiates distances between the third wireless communication device and the second wireless communication device 18 in order to determine if the use of washroom elements 62, 64, 66, 68, 70, 72, 74 and 76 is to be ascribed to one of the wireless communication device tags 18.

Each of the washroom elements 62-76 may be arranged in various physical configurations. The reporting of sequence of operation of each of the washroom elements 62-76 including the timing of use of and the status of each element including malfunction, downtime, and any other operational feature can be monitored by a portable handheld PC, PDA, or pager 42; or workstation 32.

A software program may be provided to analyze the data in order to assess the status and operation of the washroom elements in addition to monitoring specific use or sequence of use by a tag carrying entrant. Not only can the present system provide information as to the operational status of the elements as well as the level of their consumable content, for example the volume of paper on the towel roll remaining and the likely time to depletion based on historical usage but with the resolution of the state or relationship between the washroom element operation and tag resolves adherence with and determine compliance with hygiene procedures for individuals as a managed process.

Wireless communication devices 46-60 & 18, suitable for use in the present invention include but are not limited to Dustcloud or Dustmote components available from Dust Inc. Of Berkeley, Calif. Wireless communication devices 20, 21, 23, 25, 27, 29, 31 and 33 suitable for use in the present invention include but are not limited to the Airborne Wireless LAN Node, available from DPAC Technologies of Garden Grove, Calif. Wireless communication Devices 46-60, 18, 20, 21, 23, 25, 27, 29, 31, 33 and 28 suitable for use in the present invention include but are not limited to the Z-wave, available from Zensys Inc. of Berkeley, Calif.

The forgoing description of the system for monitoring Hygiene appliances has been presented for the purpose of illustration and description. It is not intended to be exhaustive or to limit the invention to the precise form disclosed. Many modifications and variations are possible in light of the above teachings. Pursuant to the above, it is to be understood that the drawings and descriptions herein are presented by way of example to facilitate comprehension of the invention and should not be construed to limit the scope thereof. It is also understood that the following claims are to cover all generic and specific features of the invention described herein and all statements of the invention which as a matter of language, might be said to fall there between. Accordingly, any and all modifications, variations or equivalent arrangements which may occur to those skilled in the art, should be considered to be within the scope of the present invention as defined in the appended claims.

What is claimed is:

1. A hygiene appliance monitoring system comprising:
a plurality of wireless communication devices, a first number of the wireless communication devices being disposed within or adjacent washroom elements and operative for monitoring and reporting status and operation thereof, a second number of the wireless communication devices being disposed in tags suitable for carrying by individuals, a third number of wireless communication devices being disposed within or adjacent washroom elements configured for recognizing a presence of the second number of wireless communication devices and differentiating distances between the second number of wireless communication devices and the third number of wireless communication devices in order to determine if use of a washroom element associated with one of the first number of wireless communication devices is to be ascribed to one of the tags and reporting thereon by an output signal; the third wireless communication device configured for communication with the first and second wireless communication devices for recording and transmitting a consolidated output signal; and a receiver in communication with said third wireless communication devices for transferring the output signal to a recording processor.

2. A hygiene appliance monitoring system comprising:
a plurality of washroom elements typically but not necessarily restricted to being found in the washroom;
a plurality of wireless communication devices, a first number of the wireless communication devices being disposed within or adjacent washroom elements and operative for monitoring and reporting status and operation thereof, a second number of the wireless communication devices being disposed in tags suitable for carrying by individuals, a third number of wireless communication devices being disposed within or adjacent washroom elements configured for recognizing a presence of the second number of wireless communication devices and differentiating distances between the second number of wireless communication devices and the third number of wireless communication devices in order to determine if use of a washroom element associated with one of the first number of wireless communication devices is to be ascribed to one of the tags and reporting thereon by an output signal; the third wireless communication device configured for communication with the first and second wireless communication devices for recording and transmitting a consolidated output signal; and a receiver in communication with said third wireless communication devices for transferring the output signal to a recording processor.

3. A hygiene appliance monitoring system according to claim 1 or 2 comprising:
a plurality of washroom elements typically but not necessarily restricted to being found in the washroom;
a plurality of wireless communication devices, a first number of the wireless communication devices being disposed within or adjacent washroom elements and operative for monitoring and reporting status and operation thereof, a second number of the wireless communication devices being disposed in tags suitable for carrying by individuals, a third number of wireless communication devices being disposed within or adjacent washroom elements configured for recognizing a presence of the second number of wireless communication devices and differentiating distances between the second number of wireless communication devices and the third number of wireless communication devices in order to determine if use of a washroom element associated with one of the first number of wireless communication devices is to be ascribed to one of the tags and reporting thereon by an output signal;
and a receiver in communication with said first and third wireless communication devices for transferring the output signal to a recording processor.

4. The system according to claim 3 wherein the washroom elements are selected from a group consisting of water closets, faucets, sinks, soap dispensers, towel dispensers, paper dispensers, drains, doors, toilet seat covers, and air fresheners.

5. The system according to one of claim 3 wherein the configuration of the third number of wireless communication devices includes circuitry and software for enabling differentiation of distances based on conventional radio frequency electromagnetic wave propagation strength as emitted from the second number of wireless communication devices and resolved by the third number of wireless communication devices.

6. The system according to claim 2 wherein the washroom elements are selected from a group consisting of water closets, faucets, sinks, soap dispensers, towel dispensers, paper dispensers, drains, doors, toilet seat covers, and air fresheners.

7. The system according to one of claims 1 or 2 wherein the configuration of the third number of wireless communication devices includes circuitry and software for enabling differentiation of distances based on conventional radio frequency electromagnetic wave propagation strength as emitted from the second number of wireless communication devices and resolved by the third number of wireless communication devices.

8. A hygiene appliance monitoring system comprising:
a plurality of wireless communication devices, a first number of the wireless communication devices being disposed within or adjacent washroom elements and operative for monitoring and reporting status and operational sequence of each washroom element; and
a receiver in communication with said wireless communication devices for transferring the output signal to a recording processor;
a second number of the wireless communication devices disposed in tags suitable for carrying by individuals; and
a third number of wireless communication devices being configured for recognizing a presence of the second number of wireless communication devices and differentiating distances between the first number of wireless communication devices and the third number of wireless communication devices in order to determine if use of one of the first number of wireless communication devices is to be ascribed to one of the tags and reporting thereon by an output signal, and
a receiver in communication with said wireless communication devices for transferring the output signal to a recording processor.

9. The system according to claim 8 wherein the sequence includes operation of a door, water closet, faucet, soap dispenser, and towel dispenser.

10. A hygiene appliance monitoring system comprising:
a plurality of washroom elements typically but not necessarily restricted to being found in the washroom;
a plurality of wireless communication devices, a first number of the wireless communication devices being disposed within or adjacent the washroom elements and operative for monitoring and reporting status and operational sequence of each washroom element; and
a receiver in communication with said communicating wireless communication devices for transferring the output signal to a recording processor;
a second number of the wireless communication devices disposed in tags suitable for carrying by individuals; and
a third number of wireless communication devices being configured for recognizing a presence of the second number of wireless communication devices and differentiating distances between the third number of wireless communication devices and the second number of wireless communication devices in order to determine if user of the first number of wireless communication devices is to be ascribed to one of the tags and reporting thereon by an output signal, and a receiver in communication with said communicating wireless communication devices for transferring the output signal to a recording processor.

11. The system according to claim 10 wherein the washroom elements are selected from a group consisting of water closets, faucets, sinks, soap dispensers, tower dispensers, paper dispensers, floor, drains, doors, toilet seat covers, and air fresheners.

12. The system according to claim 11 wherein the sequence includes operation of a door, water closet, soap dispenser, faucet, and towel dispenser.

13. A method of hygiene appliance monitoring comprising:
disposing a first number of wireless communication devices within or adjacent washroom elements;
providing a second number of wireless communication devices for transport by individuals;
disposing a third number of wireless communication devices being configured for recognizing a presence of the second number of wireless communication devices and differentiating distance between the third number of wireless communication devices and the second number of wireless communication devices;
determining if use of a washroom element associated with one of the first number of wireless communication devices is to be ascribed to one of the second number of wireless communication devices and reporting by an output signal to a receiver; and
transferring the output signal to a recording processor for analysis.

14. A hygiene appliance monitoring system comprising:
a washroom element configured for the dispensing of product;
a first wireless data communication device disposed within or adjacent the washroom element in communication with said washroom element and operatively configured for sensing, monitoring and reporting information about the status and operational sequence of the washroom element and the product;
a second wireless data communications device in communication with first said wireless data communication device and configured for receiving information from said first wireless data communication device and transferring the washroom element data output signal to a recording processor and a washroom monitoring station in communication with said second wireless data communications device and configured for receiving information from said first wireless data communications device.

15. The hygiene appliance monitoring system of claim 14 wherein the second wireless data communication device is coupled to a local area network.

16. The hygiene appliance monitoring system of claim 15 wherein the local area network is coupled to a work station.

17. The hygiene appliance monitoring system of claim 15 wherein the local area network is configured to communicate with a remote device through the internet.

18. The hygiene appliance monitoring system of claim 15 wherein the local area network is configured to communicate with a remote device through the internet and a wide area network.

19. The system according to claim 14 wherein the sequence includes operation of a door, water closet, faucet, soap dispenser, and towel dispenser.

20. The system according to claim 14 wherein said first wireless data communication device is configured for identifying the product and reporting the identification of the product to said washroom monitoring station through said second data communications device.

21. The system according to claim 20 further comprising a reader in communication with said first wireless communication device wherein said reader is selected from the group consisting of an RFID reader, a bar code reader, a printed label reader, a magnetic strip reader, a smart tag reader, a hologram reader, a luminescence reader, a biometric reader and a fluorescence reader.

22. The system according to claim 20 wherein said first wireless data communication device is configured for reporting a low product condition and wherein said data communications unit enables reporting of the low product condition if recognized product is identified.

23. The system according to claim 14 wherein said first wireless communication device is configured for identifying the product and reporting the identification of the product and the level of product remaining in said dispenser to a database, and further comprising a product reordering mechanism configured for using the database to reorder product when low and to bill for reordered product.

24. The system according to claim 14 further comprising:
a hub interconnecting with both said first wireless data communication device and said washroom monitoring station; and
a computer interconnecting with said hub, wherein said computer employs a web browser for viewing information sent via said hub.

25. The system according to claim 14 wherein said washroom element is selected from the group consisting of a paper towel dispenser, a liquid or foam soap dispenser, a toilet tissue dispenser, and an air freshener dispenser, toilet seat cover dispenser, diaper dispenser, and a feminine product dispenser.

26. The system according to claim 14 wherein said first wireless communication device is configured as an overflow sensor in communication with said washroom monitoring station through said second data communications device, wherein said overflow sensor is configured for detecting the presence of water.

27. The system according to claim 14 wherein said first wireless communication device is configured as a water flow sensor in communication with said washroom monitoring station through said second data communications device, wherein said water flow sensor is configured for detecting the flow of water.

28. The system according to claim 14 wherein said first wireless communication device is configured as a waste receptacle sensor in communication with said washroom monitoring station through said second data communications unit, wherein said waste receptacle sensor is configured for detecting the presence of waste in a waste receptacle.

29. The system according to claim 14 wherein said washroom element has a battery and wherein said first wireless communication device is configured for measuring the battery level of said battery and communicating the battery level to said washroom monitoring station through said second data communications device.

30. The system according to claim 14 wherein said first wireless communication device has a battery and wherein said first wireless communication device is configured for measuring the battery level of said battery and communicating the battery level to said washroom monitoring station through said second data communications device.

31. The system according to claim 14 wherein said first wireless communication device is configured for detecting information about the product that is selected from the group consisting of the amount of product remaining in said washroom element, the amount of product removed from said washroom element, and the rate of product removal from said washroom element.

32. The system according to claim 14 wherein said washroom monitoring station is configured for reporting a product low condition by a device selected from the group consisting of a cell phone, a PDA, a pager, and a telephone.

* * * * *